(12) United States Patent
Schmid et al.

(10) Patent No.: US 12,194,948 B2
(45) Date of Patent: Jan. 14, 2025

(54) AIRBAG OF A VEHICLE OCCUPANT RESTRAINT SYSTEM

(71) Applicants: ZF AUTOMOTIVE GERMANY GMBH, Alfdorf (DE); AUDI AG, Ingolstadt (DE)

(72) Inventors: Simon Schmid, Heuchlingen (DE); Silke Leger, Alfdorf (DE); Markus Schlipf, Göppingen (DE); Simon Kramer, Schorndorf (DE); Jochen Dünnebier, Gschwend (DE); Andreas Geist, Börtlingen (DE)

(73) Assignees: ZF AUTOMOTIVE GERMANY GMBH, Alfdorf (DE); AUDI AG, Ingolstadt (DE)

( * ) Notice: Subject to any disclaimer, the term of this patent is extended or adjusted under 35 U.S.C. 154(b) by 0 days.

(21) Appl. No.: 17/909,849

(22) PCT Filed: Mar. 8, 2021

(86) PCT No.: PCT/EP2021/055797
§ 371 (c)(1),
(2) Date: Sep. 7, 2022

(87) PCT Pub. No.: WO2021/180659
PCT Pub. Date: Sep. 16, 2021

(65) Prior Publication Data
US 2024/0198952 A1 Jun. 20, 2024

(30) Foreign Application Priority Data
Mar. 10, 2020 (DE) ..................... 10 2020 106 468.3

(51) Int. Cl.
*B60R 21/2338* (2011.01)
*B60R 21/01* (2006.01)

(52) U.S. Cl.
CPC .......... *B60R 21/2338* (2013.01); *B60R 21/01* (2013.01); *B60R 2021/01211* (2013.01); *B60R 2021/23384* (2013.01)

(58) Field of Classification Search
CPC ................ B60R 21/2338; B60R 21/01; B60R 2021/01211; B60R 2021/23384
See application file for complete search history.

(56) References Cited

U.S. PATENT DOCUMENTS 6,422,597 B1 * 7/2002 Pinsenschaum .. B60R 21/01516
280/743.2
6,511,094 B2 * 1/2003 Thomas ................ B60R 21/276
280/736

(Continued)

FOREIGN PATENT DOCUMENTS

DE    102018133050 A1    6/2020
WO    2019/202060 A1    10/2019
WO    2020/127541 A1    6/2020

OTHER PUBLICATIONS

PCT International Search Report for corresponding International Application Serial No. PCT/EP2021/055797, mailed Jun. 11, 2021, pp. 1-5.

*Primary Examiner* — Drew J Brown
(74) *Attorney, Agent, or Firm* — Tarolli, Sundheim, Covell & Tummino LLP

(57) ABSTRACT

An airbag of a vehicle occupant restraint system has an actively releasable tether element (14) disposed in an interior (16) of the airbag (10) which is connected, at an airbag-side fixation (18), permanently to the airbag (10) in the region of a contact zone (20) for the occupant, and which comprises a detachable fixing point (22) for the release. The airbag (10) can take up a smaller first filled volume ($V_1$) in which the tether element (14) and the detachable fixing point (22) are not released, and a larger second filled volume ($V_2$)

(Continued)

in which the tether element (14) is released at the actively detachable fixing point (22). In addition to the tether element (14), a tether element restrainer (26) disposed in the interior (16) of the airbag (10) is provided which acts upon a point of action (28) on a vehicle-side portion (34) of the tether element (14) distant from the airbag-side permanent fixation (18) of the tether element (14) and which is permanently fixed to a coupling point (30) distant from the contact zone (20) so that the vehicle-side portion (34) of the released tether element (14) remains connected fixedly to the vehicle via the tether element restrainer (26).

11 Claims, 2 Drawing Sheets

(56) References Cited

U.S. PATENT DOCUMENTS

| | | | | |
|---|---|---|---|---|
| 6,749,217 B2* | 6/2004 | Damian | ............ | B60R 21/2338 |
| | | | | 280/743.2 |
| 7,614,656 B2* | 11/2009 | Ishiguro | ............ | B60R 21/203 |
| | | | | 280/743.1 |
| 10,427,639 B2* | 10/2019 | Williams | ............ | B60R 21/239 |
| 2004/0012179 A1 | 1/2004 | Pinsenschaum et al. | | |
| 2004/0075261 A1 | 4/2004 | Damian et al. | | |
| 2005/0057029 A1 | 3/2005 | Thomas | | |
| 2006/0290117 A1 | 12/2006 | Fischer et al. | | |

* cited by examiner

AIRBAG OF A VEHICLE OCCUPANT RESTRAINT SYSTEM

RELATED APPLICATIONS

This application is a U.S. National Stage Application filed under 35 USC 371 claiming priority to Serial No. PCT/EP2021/055797, filed on 8 Mar. 2021; which claims priority from German Patent Application DE 10 2020 106 468.3, filed 10 Mar. 2020 the entireties of which are hereby incorporated herein by reference.

TECHNICAL FIELD

The invention relates to an airbag of a vehicle occupant restraint system.

BACKGROUND

Airbags having an adjustable volume controlled by a tether element are known. In airbags of this type a portion of the airbag wall is connected to a tether element initially fixed tightly to the vehicle so that the airbag can inflate, when the tether element is intact, only to a first volume at which a baffle of the airbag can move only up to a predetermined distance into the vehicle interior, until it is restrained by the tether element. Only when the tether element is released, for example when a fixing point of the tether element on a release unit is detached or when a weakened zone of the tether element yields, can the airbag inflate to its full volume, wherein the baffle moves further into the vehicle interior. This function is used, for example to adjust the airbag to a current position of a vehicle occupant in the vehicle interior.

SUMMARY

It is the object of the invention to improve the behavior of an airbag of this type.

This object is achieved by an airbag comprising the features of claim 1. The airbag of a vehicle occupant restraint system includes an actively releasable tether element disposed in an interior of the airbag which is permanently connected, at an airbag-side fixation, to the airbag in the region of a contact zone for the occupant and which comprises a detachable fixing point for release. The airbag can take up a smaller first filled volume in which the tether element is not released, wherein the detachable fixing point is not released, either. Moreover, the airbag can take up a larger second filled volume in which the tether element is released at the detachable fixing point. In addition to the tether element, a tether element restrainer disposed inside the airbag is provided which acts, distant from the airbag-side permanent fixation of the tether element, upon a point of action at a vehicle-side portion of the tether element, and which is permanently fixed, distant from the contact zone for the occupant with the airbag, to a coupling point so that the vehicle-side portion of the released tether element remains connected fixed to the vehicle via the tether element restrainer, when the airbag takes up the second fillable volume.

When the detachable fixing point of the tether element is released, the tether element, in particular the vehicle-side portion thereof, can move along with the contact zone then being displaced in the vehicle interior. However, the tether element is prevented from inadvertently and excessively moving in the direction of the contact zone by the tether element restrainer and, thus, is secured in the interior of the airbag.

At the detachable fixing point of the tether element, the tether element is held on the vehicle side at its vehicle-side portion, before it is actively released. Said vehicle-side fixation is usually designed to be so stable that all forces acting upon the tether element in a situation of restraint in which the tether element is not released are introduced to the vehicle via the detachable fixing point. The exact position of the detachable fixing point in the non-released state is not crucial in this context.

The contact zone for the occupant with the airbag is also referred to as baffle and constitutes the part of the airbag wall that is intended for cushioning the vehicle occupant in a situation of restraint.

In a situation of restraint, the airbag is always inflated at least up to the first filled volume. In this case, the tether element delimits further expansion of the airbag and further movement of the contact zone toward the vehicle occupant.

"Actively detachable" in this context means that the fixing point is designed so that preferably no destruction of the tether element itself is required to detach the fixing point. For example, the actively detachable fixing point can comprise an eye or a loop on the tether element through which a destroyable or movable component passes in the fixed and non-released state. Consequently, via an external impulse not emanating from the tether itself, the fixing point is actively detached and the tether element is released.

For this purpose, advantageously a release unit fixed to the vehicle and controllable particularly electronically can be used which is provided, for example, on a module fastening of the dedicated airbag module or on a body or covering part of the vehicle. The release unit can comprise an explosive stud or an appropriate mechanism, for example.

The tether element is preferably coupled to the release unit so that the tether element can be optionally released, wherein the tether element is tightly coupled to the release unit when the tether element is not released, and is disconnected from the release unit when the tether element is released. The tether element should be connected to the release unit directly and immediately on the detachable fixing point. Tear seams or predetermined breaking points on the tether element can be completely dispensed with in this case.

When the release unit can be electronically controlled, a well-targeted triggering can be caused by transmitting an electronic release signal from an appropriate controller to the release unit.

The detachable fixing point which is not released as well as in particular the release unit and the coupling point may be arranged adjacent to each other in the filled airbag, but it can also be advantageous to position said two points at a spatial distance from each other.

The permanent fixation of the tether element restrainer to the coupling point should be designed so that said fastening does not detach during the entire restraint situation.

The contact zone for the occupant with the airbag is also referred to as baffle and constitutes part of the airbag wall that is intended for cushioning the vehicle occupant in a situation of restraint.

In a situation of restraint, the airbag is always inflated at least to the first filled volume. The tether element in this case delimits further expansion of the airbag and further movement of the contact zone toward the vehicle occupant.

Preferably, also in situations of restraint in which the full volume of the airbag is intended to be used and the airbag thus is intended to be inflated up to its second filled volume, the tether element is released only when the airbag is already filled and in particular when the airbag has already reached the first filled volume. The tether element restrainer prevents the tether element from freely moving within the airbag even in those dynamic situations and suppresses in particular a forward movement of the tether element in the direction of the contact zone which would guide the tether element up to the airbag wall.

In order to meet this requirement, the tether element restrainer should have such a length that it is located, when the airbag takes up the second filled volume, in the interior of the airbag without tensile stress, but still is so short that the point of action of the tether element restrainer on the tether element and/or the vehicle-side portion of the tether element cannot reach the contact zone for the occupant with the airbag. The tether element consequently does not reduce the volume of the airbag so that the second volume corresponds to the maximally filled volume of the airbag.

For this purpose, the total length of the combination of the tether element and the tether element restrainer is advantageously chosen to be larger than a straight path inside the airbag between the airbag-side permanent fixation of the tether element and the coupling point of the tether element restrainer so that the airbag can inflate unhindered to its second filled volume. If the tether element restrainer is not intended to act upon the end of the tether element, in this case always the effective length of the tether element between the point of action of the tether element restrainer and the airbag-side fixation of the tether element must be considered, of course. The combination of the tether element and the tether element restrainer then hangs loosely inside the airbag, when the latter has taken up its second filled volume, so that in this state no tensile forces will act on the contact zone via the tether element.

In order to safely retain the tether element in the interior of the airbag, the overall length of the combination of the tether element and the tether element restrainer should further be chosen to be smaller than the afore-mentioned path plus a length of the tether element from the airbag-side permanent fixation thereof to the point of action of the tether element restrainer. This ensures that the vehicle-side end of the tether element can be prevented from moving through the interior of the airbag up to the contact zone.

In the state in which the airbag changes from the first filled volume to the second filled volume, neither the tether element nor the tether element restrainer should thus affect the deployment and the positioning of the airbag. Accordingly, also the tether element restrainer has no function in the first filled volume of the airbag.

The tether element restrainer is provided to remain fixed permanently to its point of action on the tether element and to its coupling point during the entire situation of restraint. Thus, the tether element restrainer always extends between said two points and its length remains unchanged over the entire situation of restraint.

The tether element restrainer need not be configured to take up the same forces that act on the tether element, but must merely restrain the relatively light tether element inside the airbag. Hence, for example, a thinner material such as a narrow fabric tape or a rope or cord can be used. The material of the tether element restrainer should be flexible but not elastic.

Apart from preventing the tether element, when being released, from freely moving in the interior of the airbag, the tether element restrainer preferably has no function.

Such a tether element restrainer can be used, for example, with a tether element that is permanently fixed to one or more airbag-side fixations at the inside in the region of the contact zone of the airbag and which can be used specifically also for positioning the airbag in the first filled state.

Of preference, a vehicle-side end of the tether element restrainer is fixed to the coupling point.

In a possible variant, the coupling point is located on a wall of the airbag, in particular in an area close to an inflation mouth of the airbag or in the vicinity of the inflator of the associated airbag module. The wall can also be a reinforcing layer inside the airbag. Alternatively, it is also possible, of course, to select the coupling point, e.g., on a module housing, a support fixed to the vehicle, a securing bolt of the inflator or on a release unit for the tether element.

The tether element may be a simple linear tether. To exert greater influence upon the shape and the positioning of the airbag in the first filled volume, it is appropriate, however, to select a tether element having a more complex shape, such as a multi-arm structure. Then it is particularly advantageous to fix plural arms on the inside at a respective permanent airbag-side fixation on the airbag wall so that a defined tensile stress can be exerted upon the airbag. For example, plural arms can be fixed on the inside around or on the contact surface.

Such a tether element may be manufactured of plural cut parts of an airbag fabric, which allows high flexibility of shaping at low costs at the same time.

In a possible variant, the tether element is made of such a multi-arm structure. The vehicle-side portion of the tether element in this case can be formed by one of the arms or a specifically provided cut part on which preferably both the point of action of the tether element restrainer and the detachable fixing point are disposed. It is of particular advantage here to use a rope- or cord-type tether restrainer to minimize the overall weight.

In another possible variant, the multi-arm structure forms only part of the tether element, and the latter moreover comprises a connecting element which acts upon the multi-arm structure and on which the actively detachable fixing point of the tether element is provided. The connecting element may have a linear design and is a rope or a cord, for example, to minimize the weight of the tether element and to permit low-cost manufacture.

In this case, the point of action of the tether element restrainer can be disposed either on the multi-arm structure or on the connecting element. It is possible to provide the point of action at the end of the connecting element facing away from the multi-arm structure between said end and the multi-arm structure.

Basically, the point of action of the tether element restrainer can at the same time form the detachable fixing point of the tether element or can be disposed at least in the direct vicinity thereof. It can be favorable, for example, due to the optimal positioning of seams to dispose the detachable fixing point and the point of action spaced apart from each other by several centimeters. If a release unit is used, also the point of action is thus located, when the tether element is not released, in direct vicinity of the release unit and detaches from the release unit when the tether element is released.

In a possible variant, the tether element restrainer is formed by an end-side portion of the tether element, and particularly of the connecting element, wherein the tether element restrainer can merge integrally into the tether element, particularly the connecting element. Therefore, the tether element restrainer can be a component merging integrally into the tether element at the detachable fixing point and thus can be an extension of the tether element.

Alternatively, it is also possible, however, to dispose the point of action of the tether element restrainer distant from the detachable fixing point on the tether element, in particular when the tether element restrainer is provided as a component additional to the tether element. In this case, the detachable fixing point of the tether element is not located in the path of the tether element restrainer from the coupling point thereof on the airbag or the vehicle to the point of action thereof on the tether element.

When the tether element is composed of a multi-arm structure and a connecting element, for example, the point of action can be provided on the vehicle-side end of the multi-arm structure, while the detachable fixing point is located on the vehicle-side end of the connecting element.

All permanent connections can be made in any suitable manner, specifically by sewing, bonding, welding or, if one of the parts is a rope or cord, also by knotting to a loop or an eye of another component.

The airbag is preferably a driver or passenger airbag in a passenger car, but the invention can also be materialized in any other airbags of suitable vehicles.

The airbag is preferably part of an airbag module that is fixed to the vehicle and may comprise, inter alia, also an inflator and the release unit.

BRIEF DESCRIPTION OF THE DRAWINGS

In the following, the invention shall be illustrated in detail based on plural embodiments with reference to the attached figures, wherein.

DESCRIPTION

For better clarity, in the following the same reference symbols will be used for identical or similar features for all embodiments.

Figure 1:
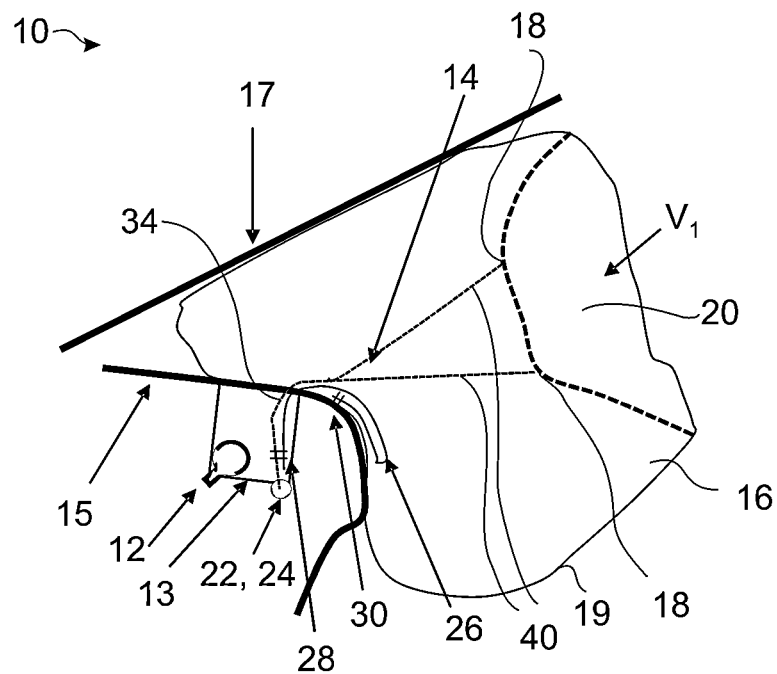
FIG. 1 shows a schematic sectional view of an airbag according to the invention as set forth in a first embodiment which is inflated to a first fillable volume.

FIG. 1 illustrates an airbag 10 of a vehicle occupant restraint system not shown in detail which is a passenger airbag for a passenger car in this case. The airbag 10 could also be any other airbag for any suitable vehicle, however.

Via an inflator 12 connected to an inflation mouth (not shown) of the airbag 10, in a situation of restraint filling gas is introduced into the airbag 10 so that the latter is inflated from its state initially folded in an airbag module 13 (not shown), the airbag 10 exiting into a vehicle interior and then being located between a dashboard 15 and a windscreen 17 in an inflated state.

The airbag 10 can take up two different defined restraining states, wherein it is inflated either to a smaller first filled volume V1 only (see FIG. 1) or to a larger second filled volume V2 (see FIG. 2), the second filled volume V2 corresponding to a fully inflated state of the airbag 10. The first filled volume V1 is indicated by a broken line in FIGS. 3 and 4.

In order to maintain the airbag 10 in the first filled volume V1 in a predetermined shape and to prevent the airbag 10 from further expanding into the vehicle interior, a tether element 14 is provided which is disposed in the interior 16 of the airbag 10.

The tether element 14 is tightly secured at its airbag-side end to an airbag-side permanent fixation 18 on the inside of a wall 19 of the airbag 10, in this case in the region of a baffle of the airbag 10 which forms a contact zone 20 of the airbag 10 for cushioning an occupant.

The tether element 14 is basically fastened, before a situation of restraint occurs, at its vehicle-side end on an actively detachable fixing point 22, in this case on a release unit 24 fixed to the vehicle (see FIG. 1).

In a situation of restraint in which the airbag 10 is intended to take up only the first filled volume V1, the tether element 14 remains fixed to the vehicle with its detachable fixing point 22 on the release unit 24 so that it is tensioned between the release unit 24 and its airbag-side permanent fixation 18. This state is shown in FIG. 1. The maintained connection between the release unit 24 and the actively detachable fixing point 22 allows to build up tensile stress that acts against the inner pressure of the airbag 10 and that maintains the contact zone 20 at a predetermined distance from the inflator 12. In each of FIGS. 3 and 4, said state is indicated by the broken line.

In this case, the tether element 14 remains tightly connected to the release unit 24 during the whole situation of restraint. The tether element 14 is designed so that it withstands the prevailing tensile forces. The forces acting upon the tether element 14 are derived into the vehicle via the release unit 24.

If the airbag 10 is intended to take up its second restraining state with the second filled volume V2, however, the release unit 24 is activated, for example upon reaching the first filled volume V1, so that the actively detachable fixing point 22 detaches from the release unit 24. Upon triggering of the release unit 24, the detachable fixing point 22 is provided freely in the interior 16 of the airbag 10. The tether element 14 remains connected to the airbag wall at its airbag-side fixation 18.

The release unit 24 is an electronic release unit in this case which is activated by a controller (not shown) transmitting an electronic release signal and which comprises, for example, an electronically triggerable explosive stud or an electronically controllable release mechanism (not shown in detail). In this example, the release unit 24 is shown in the vicinity of the inflator 12, but it could be provided at any suitable position fixed to the vehicle, wherein it is suitable, of course, to provide the release unit 24 as part of the airbag module 13 of the airbag 10.

Figure 2:
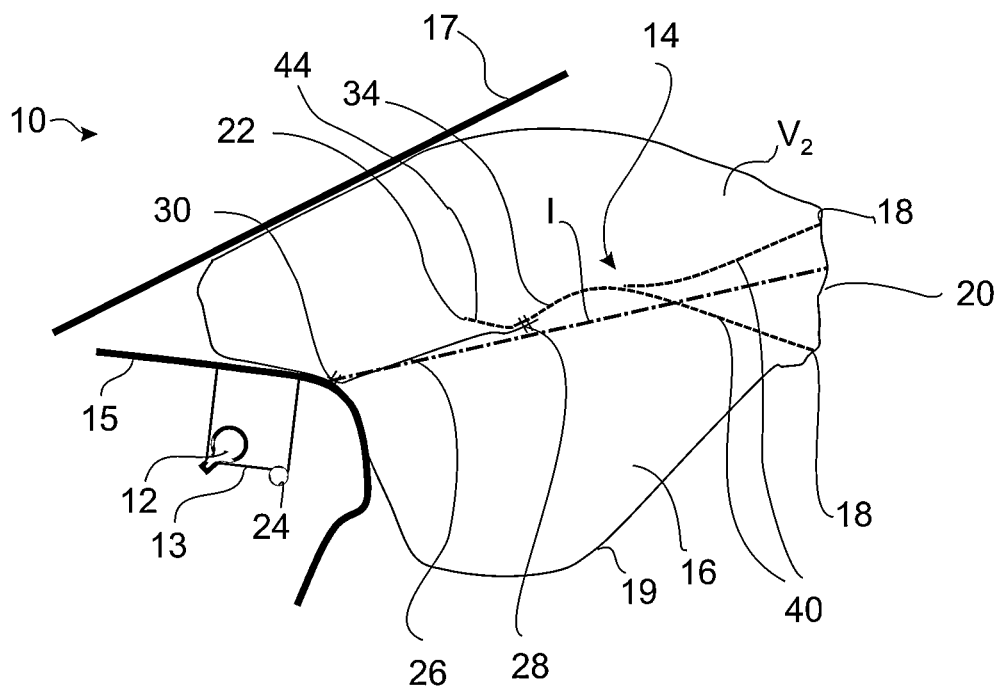
FIG. 2 shows the airbag of FIG. 1 which is inflated to a second fillable volume.
Figure 3:
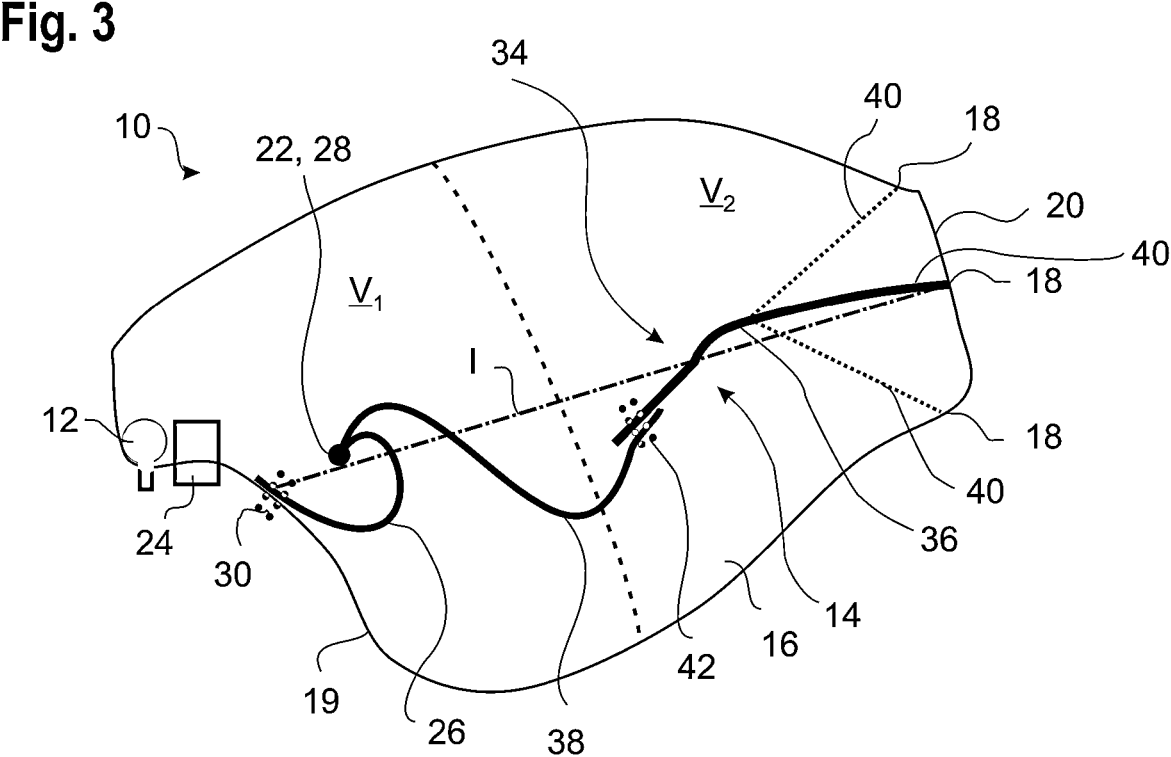
FIG. 3 shows a schematic sectional view of an airbag according to the invention inflated to a second fillable volume as set forth in a second embodiment.
Figure 4:
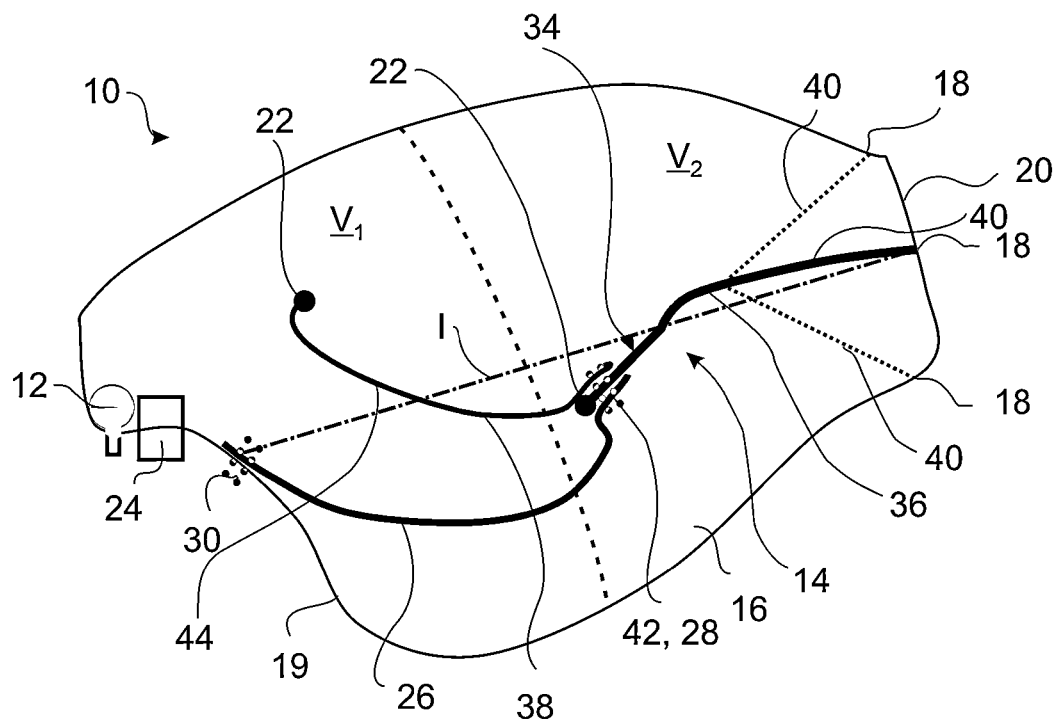
FIG. 4 shows a schematic sectional view of an airbag according to the invention inflated to a second fillable volume as set forth in a third embodiment.

Since, upon activation of the release unit 24, the contact zone 20 is no longer restrained, the airbag 10 inflates to its full volume, i.e., the second filled volume V2, and the contact zone 20 moves further into the vehicle interior than in the first filled volume V1. This state is shown in FIGS. 2, 3 and 4.

The tether element 14 initially moves along with the contact zone 20 and also into the interior 16 of the airbag 10.

In order to prevent the tether element 14 from moving completely freely in the interior 16 of the airbag 10, the tether element 14 is permanently connected to the airbag 10 (as shown here) or to the vehicle via a tether element restrainer 26.

In this example, the tether element restrainer 26 is connected, such as sewn up, at a first end at a point of action 28 permanently to the tether element 14 and, at a second end at a coupling point 30, permanently to the wall 19 of the airbag 10.

The total length of the combination of the tether element 14 and the tether element restrainer 26, based on the point of action 28, is selected so that it is larger than a distance I between the coupling point 30 and the contact zone 20 of the airbag 10 (in an imaginary fully inflated airbag 10 without a tether element restrainer 26) so that the tether element 14 and the tether element restrainer 26 are located loosely and without tensile stress in the interior 16 of the airbag 10, when the latter takes up its second filled volume V2.

However, the total length of the combination of the tether element 14 and the tether element restrainer 26, based on the point of action 28, is also selected so that it is smaller than the distance I plus a length between the point of action 28 and the permanent airbag-side fixation 18 in order to ensure that the tether element 14, specifically a vehicle-side portion 34 of the tether element 14, cannot get in touch from inside with the contact zone 20 of the airbag 10.

The exact configuration of the tether element 14 and the arrangement of the tether element restrainer 26 on the tether element 14 are possible to be varied within a broad range at the discretion of those skilled in the art.

The tether element restrainer 26 may be configured to be generally weaker than the tether element 14, as the forces acting upon the former are definitely lower than the forces which the tether element 14 must withstand in the first situation of restraint.

In the embodiment shown in FIGS. 1 and 2, the tether element 14 substantially consists of a multi-arm structure 36. The multi-arm structure 36 is formed of plural fabric cuts tightly connected to each other which form plural, such as five, arms 40. In the example shown here, all but one of the arms 40 are secured on the surface or on the edge of the contact zone 20 of the airbag 10 and form the airbag-side fixation 18. The still free arm 40 constitutes the vehicle-side portion 34 of the tether element 14.

The tether element restrainer 26 is a separate component and in this case is a tape or a cord of lower material thickness than the tether element 14.

The coupling point 28 to which the tether element restrainer 26 is secured on the vehicle-side portion 34 in this example is at a distance of several centimeters from the actively detachable fixing point 22 which is provided at the free end of the vehicle-side portion 34 here. It would also be imaginable to spatially combine the point of action 28 and the detachable fixing point 22.

Since, when the actively detachable fixing point 22 is released, the length of the tether element restrainer 26 between the coupling point 30 and the point of action 28 is additionally available, the airbag 10 can expand up to its second filled volume V2 without tensile forces acting upon the tether element 14. However, the tether element 14, and especially the vehicle-side portion 34 thereof, cannot move so far toward the contact zone 20 through the interior 16 of the airbag 10 that it could reach the contact zone 20, as the tether element 14 is prevented before from a further movement by the tether element restrainer 26.

FIGS. 3 and 4 show possible variants, but the invention is not limited to the shown examples.

In both shown variants, the tether element 14 is composed of two single components tightly connected to each other, namely the multi-arm structure 36 and a connecting element 38 which are permanently fixed to each other at a connecting point 42.

The connecting element 38 is a narrow tape or a rope or cord, for example. At one end, the connecting element 38 is connected to the free end of the vehicle-side portion 34 of the tether element 14, while an opposite end of the connecting element 38 forms the actively detachable fixing point 22 and, prior to the release of the tether element 14, is coupled to the release unit 24.

As a matter of course, it would be generally possible to make use of a different complex structure or else of a simple linear tether as tether element 14.

In FIG. 3, the tether element restrainer 26 extends in extension of the connecting element 38, the actively detachable fixing point 22 being formed at the transition from the connecting element 38 to the tether element restrainer 26.

The division between the tether element restrainer 26 and the connecting element 38 is made, for example, solely by the position of the actively detachable fixing point 22, when the connecting element 38 and the tether element restrainer 26 are formed integrally with each other and the tether element restrainer 26 substantially forms the vehicle-side end of the connecting element 38.

In this case, the detachable fixing point 22 forms at the same time the point of action 28.

Prior to the release of the tether element 14, the tether element restrainer 26 extends from the coupling point 30 to the actively detachable fixing point 22 which is fixed to the release unit 24. From there, the connecting element 38 extends to the vehicle-side portion 34 of the multi-arm structure 36 which is fixed, in turn, at its arms 40 to the airbag-side fixations 18 in the region of the contact zone 20 on the inside of the wall of the airbag 10.

When the release unit 24 is triggered, merely the connection between the release unit 24 and the actively detachable fixing point 22 is disconnected so that from then on, the actively detachable fixing point 22 hangs freely in the interior 16 of the airbag 10. All other connections are maintained.

The actively detachable fixing point 22 is thus located in the direct path between the coupling point 30 and the vehicle-side portion 34 of the tether element 14.

The embodiment shown in FIG. 4 differs from the above-described embodiment merely by the position of the point of action 28 of the tether element restrainer 26 and the actively detachable fixing point 22.

In this embodiment, the actively detachable fixing point 22 is not located in the path of the tether element restrainer 26 from the coupling point 30 to the vehicle-side portion 34 of the tether element 14. The tether element restrainer 26 is, e.g., a component provided in addition to the tether element 14 that extends in portions in parallel to the tether element 14 and here particularly in parallel to the connecting element 38. The point of action 28 is somewhat offset against the free end of the vehicle-side portion 34 of the tether element 14 toward the permanent airbag-side fixation 18 thereof.

FIG. 4 also illustrates an example in which the point of action 28 is located at the transition from the multi-arm structure 36 to the connecting element 38, i.e., at the connecting point 42.

When the tether element 14 is released, a free end 44 of the tether element 14 that includes the detachable fixing point 22 (in this case the whole connecting element 38) hangs freely in the interior 16 of the airbag 10. Therefore, the length of said free end 44 and the length of the tether element restrainer 26 should be selected to be so short that also the free end 44 cannot reach the contact zone 20. This is also applicable to the first embodiment, when the free end 44 is formed by a portion of the multi-arm structure 36 itself.

The invention claimed is:

1. A vehicle occupant restraint system, comprising:
   an airbag;
   a tether element; and
   a tether element restrainer,
   wherein the tether element is disposed in an interior of the airbag, the tether element comprising a permanent airbag-side fixation in which the tether element is fixed permanently to the airbag in the region of a contact zone for the occupant, the tether element further comprising an actively detachable fixing point that secures the tether element to the airbag, the fixing point having a released condition and a non-released condition,
   wherein, when the fixing point is in the non-released condition, the tether element becomes tensioned between the fixing point and the airbag-side fixation causing the tether element to restrain the airbag in the region of the contact zone so that the airbag inflates to a first filled volume,
   wherein, when the fixing point is in the released condition, tension on the tether element is released and the airbag is free from restraint in the region of the contact zone so that the airbag inflates to a second filled volume, which is greater than the first filled volume, wherein the second filled volume is a fully inflated volume of the airbag free from restraint by the tether element,
   wherein the tether element restrainer is configured to act upon a point of action on a vehicle-side portion of the tether element distant from the airbag-side fixation of the tether element, the tether element restrainer being permanently fixed, distant from the contact zone, to a coupling point so that the vehicle-side portion of the released tether element remains connected fixedly to the vehicle via the tether element restrainer when the fixing point is in the released condition and the airbag inflates to the second filled volume.

2. The vehicle occupant restraint system according to claim 1, wherein the tether element is coupled, at the actively detachable fixing point, to an electronically controllable release unit that maintains the fixing point in the non-released condition and is actuatable to release the fixing point to the released condition, wherein the tether element when in the non-released condition is tightly coupled to the release unit, wherein the tether element is detached from the release unit when the tether element is in the released condition.

3. The vehicle occupant restraint system according to claim 1, wherein the tether element restrainer has a length configured so that it is located in the interior of the airbag without tensile stress when the airbag takes up the second filled volume, and also so that the point of action on the vehicle-side portion of the tether element cannot reach the contact zone of the airbag.

4. The vehicle occupant restraint system according to claim 1, wherein the tether element is fixed to the inside of the airbag in the region of the contact zone.

5. The vehicle occupant restraint system according to claim 1, wherein a vehicle-side end of the tether element restrainer is fixed to the coupling point and wherein the coupling point is located on a wall of the airbag.

6. The vehicle occupant restraint system according to claim 1, wherein the tether element comprises a multi-arm structure, wherein the permanent airbag-side fixation comprises plural arms of the multi-arm structure attached to the airbag in the region of the contact zone.

7. The vehicle occupant restraint system according to claim 6, wherein the tether element comprises a connecting element which acts upon the multi-arm structure and on which the actively detachable fixing point of the tether element is provided.

8. The vehicle occupant restraint system according to claim 1, wherein the point of action of the tether element restrainer also forms the actively detachable fixing point of the tether element.

9. The vehicle occupant restraint system according to claim 1, wherein the tether element restrainer is a component merging integrally into the tether element at the actively detachable fixing point and, thus, is an extension of the tether element.

10. The vehicle occupant restraint system according to claim 1, wherein the tether element restrainer is provided as a component additional to the tether element and wherein the point of action of the tether element restrainer is disposed on the tether element distant from the actively detachable fixing point.

11. The vehicle occupant restraint system according to claim 1, wherein the airbag is a driver airbag or a passenger airbag.

* * * * *